US008109572B2

(12) United States Patent
Kohler et al.

(10) Patent No.: US 8,109,572 B2
(45) Date of Patent: Feb. 7, 2012

(54) DEVICE FOR ADJUSTING THE SEAT BACK ANGLE IN A WHEELCHAIR AND A WHEELCHAIR COMPRISING SUCH A DEVICE

(75) Inventors: Thomas Markus Kohler, Münchenstein (CH); Florian Kaufmann, Sissach (CH); Simon Bruce Laurence Watterton, Hofstetten (CH)

(73) Assignee: Invacare Corporation, Elyria, OH (US)

( * ) Notice: Subject to any disclaimer, the term of this patent is extended or adjusted under 35 U.S.C. 154(b) by 665 days.

(21) Appl. No.: 12/088,615

(22) PCT Filed: Sep. 27, 2006

(86) PCT No.: PCT/IB2006/053517

§ 371 (c)(1), (2), (4) Date: Jul. 17, 2008

(87) PCT Pub. No.: WO2007/036885

PCT Pub. Date: Apr. 5, 2007

(65) Prior Publication Data

US 2009/0212618 A1 Aug. 27, 2009

(30) Foreign Application Priority Data

Sep. 29, 2005 (EP) .................................... 05405564

(51) Int. Cl.
*B60N 2/02* (2006.01)

(52) U.S. Cl. ....................................................... 297/364

(58) Field of Classification Search .................. 297/363, 297/364, 354.1, 362.12, 353

See application file for complete search history.

(56) References Cited

U.S. PATENT DOCUMENTS

| | | | | |
|---|---|---|---|---|
| 2,090,376 | A * | 8/1937 | Russell | 297/364 |
| 2,515,261 | A * | 7/1950 | Poskin | 297/364 |
| 3,784,252 | A * | 1/1974 | Peterson | 297/364 |
| 4,614,454 | A * | 9/1986 | Kassai | 297/363 |
| 5,152,543 | A | 10/1992 | Sims et al. | |
| 5,246,272 | A * | 9/1993 | Kato et al. | 297/364 |
| 5,573,345 | A * | 11/1996 | Voss et al. | 297/363 |
| 6,012,776 | A * | 1/2000 | Schneider et al. | 297/364 |
| 6,113,189 | A | 9/2000 | Bennett et al. | |
| 6,164,723 | A * | 12/2000 | Ganot | 297/378.12 |
| 6,488,338 | B1 * | 12/2002 | Hoshihara | 297/364 |
| 6,742,843 | B2 * | 6/2004 | Golynsky | 297/363 |

(Continued)

FOREIGN PATENT DOCUMENTS

EP 0867165 9/1998

(Continued)

*Primary Examiner* — Jose V Chen

(74) *Attorney, Agent, or Firm* — Calfee, Halter & Griswold LLP

(57) ABSTRACT

The wheelchair comprises a seat back a module (2) movably coupled to a seat module (5). Two lateral plates (10, 10') are secured to the seat back module (2) and pivotally mounted on the seat module (5). Each of said plate is provided with a recess (18, 18') adapted to lodge an excenter member (19) comprising two parallel side faces (26, 27) and being perforated by three holes (21, 22 and 23), adapted to receive a spring release locking pins for locking the angle position of said seat back module. Due to the positioning of said three holes and the possibility of lodging the excenter member with either one of its two side faces (26 or 27) inside the recess (18), five different locking angle positions of the seat back module are possible.

6 Claims, 3 Drawing Sheets

U.S. PATENT DOCUMENTS

| | | | | |
|---|---|---|---|---|
| 6,910,738 | B2 * | 6/2005 | Bonk | 297/364 |
| 7,100,988 | B1 * | 9/2006 | Hyslop | 297/376 |
| 7,296,857 | B2 * | 11/2007 | Shinozaki et al. | 297/364 |
| 7,387,340 | B2 * | 6/2008 | Wilkening | 297/378.12 |
| 7,455,362 | B2 * | 11/2008 | Hanson et al. | 297/363 |
| 2002/0005659 | A1 | 1/2002 | Schaffner et al. | |
| 2004/0104514 | A1 | 6/2004 | Ishikawa et al. | |

FOREIGN PATENT DOCUMENTS

| | | |
|---|---|---|
| FR | 2845893 | 10/2002 |

* cited by examiner

DEVICE FOR ADJUSTING THE SEAT BACK ANGLE IN A WHEELCHAIR AND A WHEELCHAIR COMPRISING SUCH A DEVICE

TECHNICAL FIELD

The present invention is concerned with a device for adjusting the seat back angle in a wheelchair, said wheelchair comprising a seat back module movably coupled to a seat module. It also concerns a wheelchair comprising such a device.

BACKGROUND OF THE INVENTION

Wheelchairs comprising inclinable seat backs are already known for example from U.S. Pat. No. 6,113,189, EP 0867165 and FR 2,845,893.

U.S. Pat. No. 3,784,252 describes a seat back adjustment mechanism for a baby stroller, comprising a sector plate mounted to the frame of the stroller at each side of the lower portion of the back of the seat.

Said devices are arranged to permit the user to adjust the angle of the seat back several times a day if desired. Their adjusting mechanisms are therefore either rather sophisticated or bulky.

The aim of the present invention is to propose a simple, easy to handle and low cost device for adjusting the seat back angle in a wheelchair, such in particular in lightweight wheelchairs suitable for people aiming to a large autonomy and necessitating a unique preliminary seat back angle adjustment to the size and need of the user rather than a daily back angle adjustment.

SUMMARY OF THE INVENTION

The present invention addresses the aforementioned need by providing a device for adjusting the seat back angle in a wheelchair, said wheelchair comprising a seat back module movably coupled to a seat module, and wherein said device comprises two lateral plates, each of which is intended on the one hand to be secured to said seat back module and on the other hand to be pivotably mounted on an axle of said seat module, each of said plates being provided with a recess adapted to lodge an excenter member comprising two parallel side faces and having at least one plan of symmetry perpendicular to said faces and defining one axis of symmetry in said faces and being perforated by at least two first holes not symmetrically positioned with regard to each other relative to said axis of symmetry, said holes being adapted to receive a locking pin for securing the angle position of said seat back module with regard to said seat module, whereby at least three different locking position can be chosen, depending on the positioning of said excenter members in said recesses and which can be turned inside out in said recesses.

The locking of the seat back angle can be obtained by two spring release locking pins mounted on both sides of the seat module and manually operable through a single actuating means, for example a string.

The excenter member can be perforated by a third hole centered on said axis of symmetry of the excenter member, said at least two first holes being excentered with regard to said axis of symmetry.

The present invention also concerns a wheelchair including such a device.

One advantage of the device of the invention is that it is very easy to handle and procures a very solid locking of the back seat position. Further, since once the desired locking angle of the seat back module has been chosen by the user, the excenter members are screwed inside the recesses of the lateral plates, said locking position will obligatorily always be retrieved by the user after having folded and unfolded the seat back module, while of course it is always possible for him to change this locking angle position by unscrewing the excenter members and repositioning them in their recesses.

Other features and advantages of the invention will appear from the following description, referring to the accompanying drawings.

EMBODIMENTS OF THE INVENTION

Figure 1:
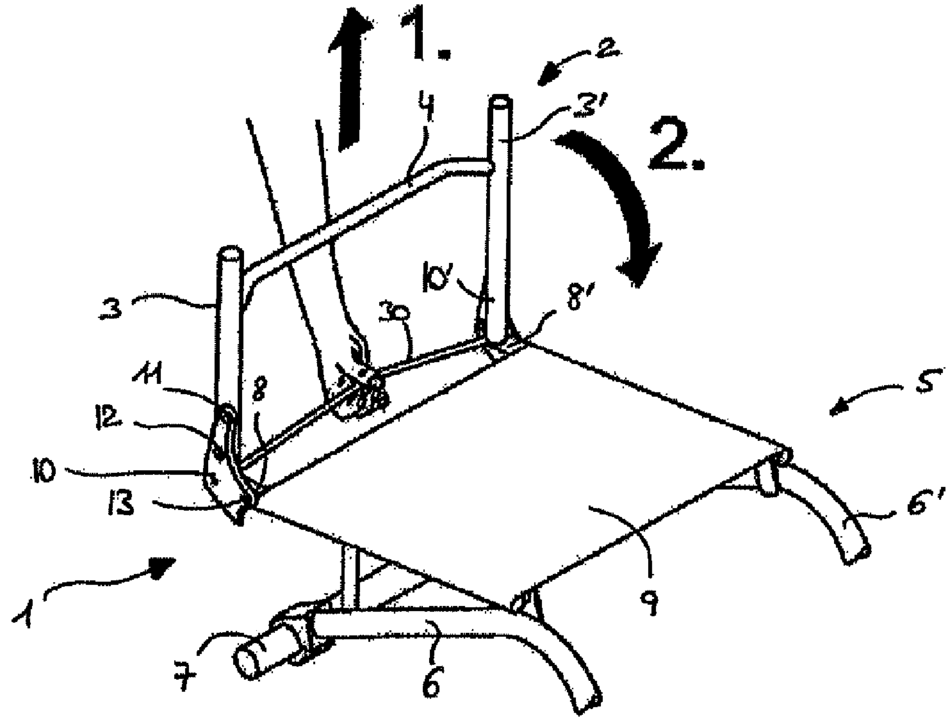
FIG. 1 is a schematic and partial view of a wheelchair including the device of the invention.
Figure 3:
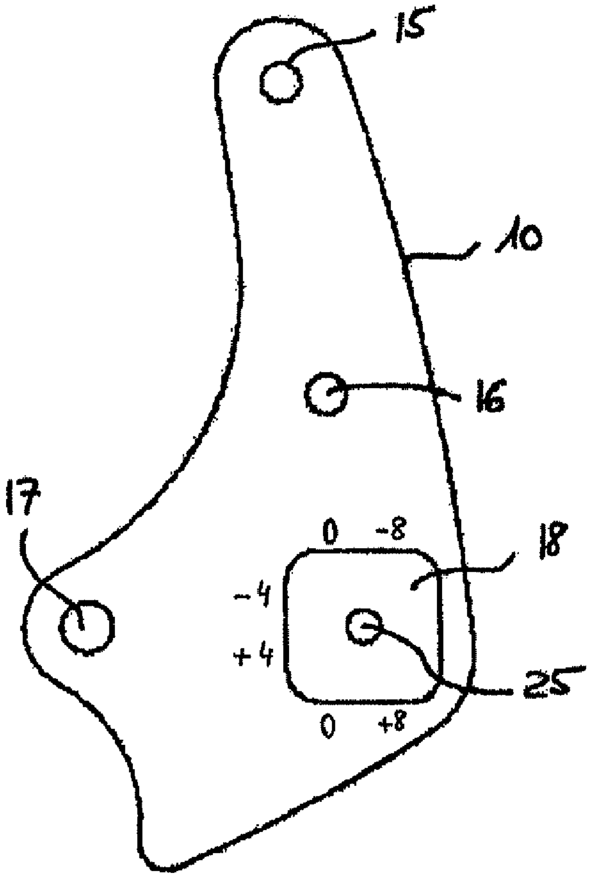
FIG. 3 is a plan view of the other side lateral plate.

FIG. 1 schematically and partially illustrates the upper part of a wheelchair frame assembly 1 including a seat back module 2 comprising two back supports 3, 3' connected with each other by means of a transverse rod 4, and a seat module 5 formed by two lateral supports 6, 6' secured to a rear axle 7 and longitudinal seat support 8, 8' supporting a seat 9. The wheels which are not represented can be any type of wheels known per se, which are usually mounted on this type of wheelchair. Two lateral plates 10, 10' are secured each by two screws 11, 12 to the respective back supports 3, 3' and pivotally mounted on a horizontal axle 13 of the seat module 5. To this end, as can be seen on FIG. 3, each lateral plate 10, 10' is provided with two transverse through holes 15, 16 intended to cooperate with the screws 11, 12 for the fixation of the plates to the supports 3, 3' and by a transverse through hole 17 intended to cooperate with the axle 13. Each lateral plate 10, 10' is also provided with a recess 18, 18' adapted for the lodgment of an excenter member 19 comprising two parallel side faces and locking holes perforated through said faces and arranged to allow an adjustment of the seat back angle as will be described hereunder.

In the example illustrated on the drawings, the excenter member 19 has a square outer shape corresponding to the square shape of the recess 18, 18' provided in the lateral plate 10, 10', the outer dimension of the excenter member being slightly smaller than the inner dimension of the recess 18, 18' in order to allow an easy lodging and unlodging of said excenter member into said recess.

Figure 4:
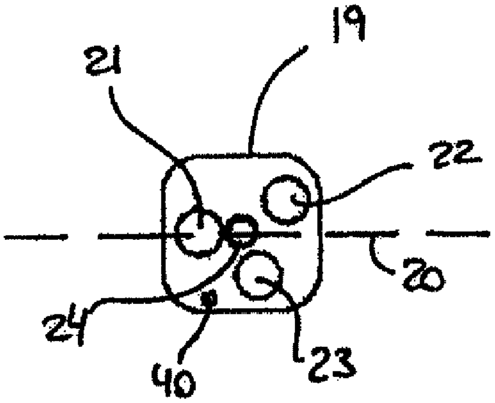
FIG. 4 is a plan view of an example of excenter member.

As illustrated on FIG. 4, the excenter member 19 is provided with a first transverse through hole 21 centered on one of the axis of symmetry 20 of the member, and with two further transverse through holes 22 and 23 excentered with regard to said axis 20 and not symmetrically disposed with each other relatively to said axis 20. Said excenter member is further provided with a centered threaded smaller through hole 24 intended to receive a screw to be screwed in a threaded hole 25 located in the center of the recess 18, 18' of the lateral plates for its fixation to the lateral plate once the member is lodged in the recess 18, 18'.

Figure 5:
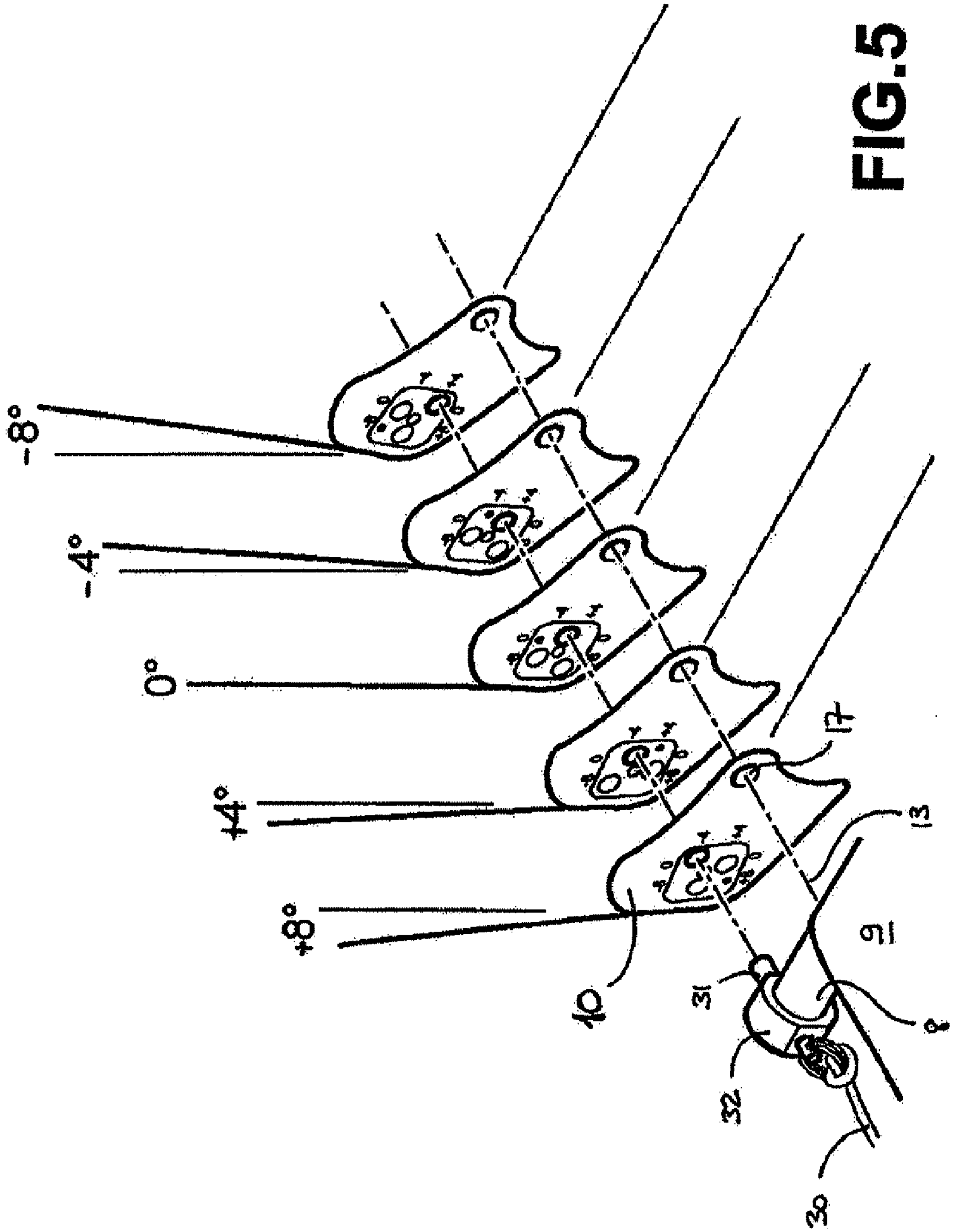
FIG. 5 illustrates the five locking angle positions of the seat back module allowed with the excenter member of FIG. 4.

The wheelchair is further provided with a string 30 (see FIGS. 1 and 5) acting at its two ends on two spring release locking pins 31 mounted in locking pin housings 32 provided at the rear ends of each of the seat supports 8, 8', said locking pins being arranged to engage in one of the holes 21, 22 or 23 of the excenter member to lock the seat back module in position. As shown on FIG. 1, when the user pulls on the string in the direction of the arrow 1, the pins 31 disengage from the corresponding hole 21, 22 or 23, allowing a folding movement of the seat back module (see arrow 2).

In the example illustrated on the drawings, the location of the transverse holes 21, 22 and 23 on the excenter members are chosen so as to allow three locking angle positions of the seat back module 2 with regard to the seat module 5, i.e. at 0°, −4° and −8°, when the excenter member is lodged with its first side face 26 inside the recess 18, and with three positions corresponding to 0°, +4° and +8° when the excenter member is turned inside out and lodged with its second side face 27 inside the recess 18. In this way, due to the excentered positioning of the holes 22 and 23, five different locking angle positions of the seat back module relative to the seat module are possible.

In order for the user to place the excenter member in the correct position within the recesses 18, 18', corresponding to the desired seat back locking angle position, the excenter members are provided on both of their sides with an index 40 (see FIGS. 2 and 4), while the lateral plates 10, 10' are provided with notices of the inclination angles of the seat back module (+8, 0, +4, −4, 0, −8) located around the recess 18, 18' in such a way to indicate to the user how to position the excenter member within the recess, by positioning said excenter member with its index in front of the desired angle notice.

Figure 2:
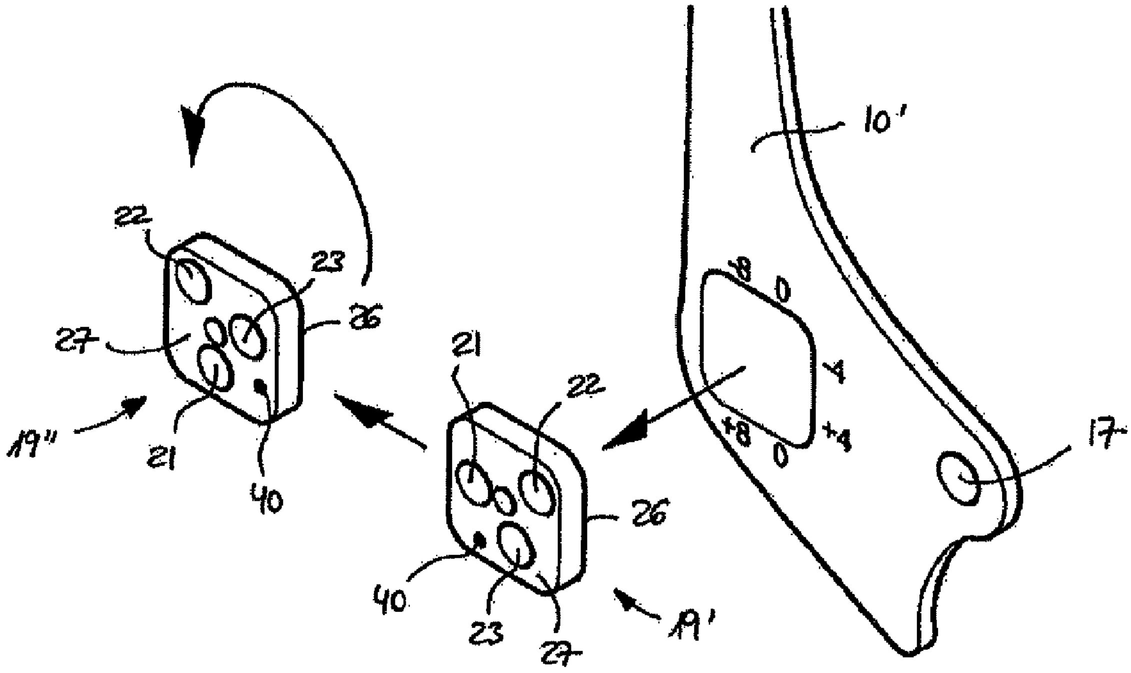
FIG. 2 is an elevation view of one of the lateral plate of the device, and illustrating the cooperation of said plate with the excenter member provided with three through holes.

In the example illustrated on FIG. 2, the excenter member 19 is represented in a first position 19' with its index 40 being positioned in front of the notice +8°, corresponding to a locking position inclined of 8° rearward, while in the position 19", after a counter clockwise rotation of 90° of the excenter member, the index 40 will be positioned in front of the notice 0°, corresponding to a vertical locking position of the seat back module.

While the above described embodiment includes a square shaped excenter member provided with three locking holes 21, 22, 23, said excenter member could also be provided with only two such holes, one being centered on an axis of symmetry of the member and the other being excentered relative to said axis, thus allowing three different locking angle positions of the seat back module, or none of said two holes being centered on an axis of symmetry of the member and being not symmetrically positioned with regard to each other relative to said axis of symmetry, thus allowing four different locking angle positions of the seat back module. Of course, also more than three such holes allowing more than five locking angle positions can be provided. Further, any other suitable outer shape (but of course not a circular shape) can also be provided for the excenter member, such for example a triangular shape or a suitable polygonal shape, or still any other suitable shape with two parallel side faces and comprising at least one plan of symmetry perpendicular to said faces.

The invention claimed is:

1. A device for adjusting the seat back angle in a wheelchair, said wheelchair comprising a seat back module movably coupled to a seat module, wherein said device comprises two excenter members, each excenter member comprising two parallel side faces and having at least one plan of symmetry perpendicular to said faces and defining one axis of symmetry in said faces and being perforated by at least two first holes not symmetrically positioned with regard to each other relative to said axis of symmetry, said holes being adapted to receive a locking pin for securing the angle position of said seat back module with regard to said seat module, and two lateral plates, each of which is adapted to be secured to said seat back module and to be pivotably mounted on an axle of said seat module, each of said plates being provided with a recess adapted to lodge one of said excenter members, wherein each excenter member has a polygonal outer shape corresponding to the polygonal shape of the recess provided in the lateral plate, the outer dimension of the excenter member being slightly smaller than the inner dimension of the recess in order to allow an easy lodging and unlodging of said excenter member into said recess, wherein each excenter member is perforated by a third hole centered on said axis of symmetry of the excenter member, said at least two first holes being excentered with regard to said axis of symmetry, such that at least three different locking position can be chosen, depending on a positioning of said excenter members in said recesses and which can be turned inside out in said recesses.

2. Device according to claim 1, wherein the locking of the seat back angle is obtained by two spring release locking pins mounted on both sides of the seat module and manually operable through a single actuating means.

3. Device according to claim 2, wherein said actuating means is a string.

4. Device according to claim 1, wherein each of said excenter members is provided on both of its sides with respective indexes positioned to cooperate with notices of inclination angle of the seat back module in such a way to indicate to a user how to position the member into the recess, by positioning said excenter member with its index in front of the desired angle notice.

5. Device according to claim 1, wherein each of said excenter members has a square outer shape.

6. Wheelchair comprising a seat back module movably coupled to a seat module and comprising a device as claimed in claim 1.

* * * * *

UNITED STATES PATENT AND TRADEMARK OFFICE

CERTIFICATE OF CORRECTION

PATENT NO. : 8,109,572 B2
APPLICATION NO. : 12/088615
DATED : February 7, 2012
INVENTOR(S) : Kohler et al.

It is certified that error appears in the above-identified patent and that said Letters Patent is hereby corrected as shown below:

On the Title Page:
Item (73) Assignee, should read -- Invacare International SARL, Gland, Switzerland (CH) --

Signed and Sealed this
Twelfth Day of June, 2012

David J. Kappos
*Director of the United States Patent and Trademark Office*